United States Patent [19]

Edström et al.

[11] 4,434,001
[45] Feb. 28, 1984

[54] METHOD FOR MANUFACTURING METAL FROM FINE-GRAIN METAL-OXIDE MATERIAL

[75] Inventors: John O. Edström, Stocksund; Karl G. Görling, Lidingö, both of Sweden

[73] Assignee: SKF Steel Engineering AB, Hofors, Sweden

[21] Appl. No.: 403,517

[22] PCT Filed: Nov. 3, 1981

[86] PCT No.: PCT/SE81/00321
§ 371 Date: Jul. 9, 1982
§ 102(e) Date: Jul. 9, 1982

[87] PCT Pub. No.: WO82/01724
PCT Pub. Date: May 27, 1982

[30] Foreign Application Priority Data

Nov. 10, 1980 [SE] Sweden .............................. 8007882

[51] Int. Cl.³ .............................................. C21B 13/12
[52] U.S. Cl. .............................................. 75/3; 75/11; 75/38; 75/25; 75/26
[58] Field of Search ..................... 75/11, 34, 35, 26, 3, 75/38

[56] References Cited

U.S. PATENT DOCUMENTS 3,936,296 2/1976 Campbell ................. 75/38
3,984,229 10/1976 Gorling ..................... 75/26
4,072,504 2/1978 Perdahl et al. ........... 75/38
4,340,420 7/1982 Santen ....................... 75/11

*Primary Examiner*—M. J. Andrews
*Attorney, Agent, or Firm*—Fleit, Jacobson, Cohn & Price

[57] ABSTRACT

A method for producing fine-grain iron-containing metal oxide material, the method comprising a first reduction stage wherein the oxide material is at least partially reduced in a fluidized state at a temperature of approximately 1025°–1275° K. by a reducing gas which is carbon monoxide or carbon monoxide mixed with hydrogen, followed by a smelting and final reduction stage to form a metal melt, the reducing gas used for the first reduction stage obtained from the smelting and final reduction stage. Prior to the first reduction stage, relatively large cakes or shaped pieces are formed from the fine-grain metal-oxide material in the presence of moisture and a hydraulic binder and the cakes or pieces caused to harden. The hardened oxide material is disintegrated and classified to form the starting material for the first reduction stage and is given a particle size distribution such that the material forms a fluidized bed which is substantially stationary at the considerable gas velocity required to carrying out the reduction process without bogging at the temperature selected for the first reduction stage.

17 Claims, No Drawings

METHOD FOR MANUFACTURING METAL FROM FINE-GRAIN METAL-OXIDE MATERIAL

The present invention relates to a method for manufacturing metal from fine-grain metal oxide.

In recent years, several new processes for manufacturing metal, primarily crude iron, from particulate material containing iron oxide have been proposed and are undergoing development. One feature which is common to a number of these processes is that the iron-oxide material is partially reduced to a greater or lesser extent while in a solid state, prior to being smelted and finally reduced. A desideratum herewith is to be able to partially reduce the iron-oxide material without needing to subject the material to a preceding, conventional and expensive suction-sintering or pellet-sintering process. In this respect, the partial reduction of iron-oxide material in a fluidized bed is considered a suitable method of procedure, since it provides a particulate product which can be charged directly to the smelting and final reduction stage.

Greatly enriched concentrate as well as metallurgicaldust containing iron oxide, however, are much too fine to enable them to be satisfactorily partially reduced in practice in a fluidized bed. This is partly because the rate at which the fine material fluidizes is so low that a grid of unreasonably large area is required to enable a sufficient quantity of reduction gas to be supplied without causing the material to be blown from the bed, and partly because the fine particles of the material which is to form the fluidized bed have a great tendency to agglomerate, already at relatively low temperatures. Furthermore, such fine-grain materials require a grid with so densely located pores that the fluidizing and reduction gas must be extensively cleaned of dust, in order to prevent clogging of the pores.

Among the aforementioned proposed metal-manufacturing processes under development, primarily processes for manufacturing crude iron, is included the plasma-smelt reduction process (PSR-process), in which particulate metal-oxide material is partially reduced to 50–60% in solid phase and then injected together with slag formers and reductant into a cavity forming a melt-reduction zone in a coke-filled shaft, the partially reduced material being melted and finally reduced while supplying the requisite energy herefor with the aid of a plasma burner. The gas leaving the shaft has a high temperature and is very rich in, primarily, carbonmonoxide. Hence, in this respect the gas is well suited for use in carrying out the aforesaid partial reduction process. Such partial reduction can be carried out to advantage in a fluidized bed, provided that the particulate starting material has a suitable form with respect the particle size and particle-size distribution. As beforementioned, highly enriched concentrates and fine dusts do not lend themselves for direct use in conjuction with reduction processes carried out in a fluidized bed, which limits the possibilities of optimally utilizing the PSR-process for highly enriched concentrates and other fine-grain starting materials, among which can be mentioned dust from oxygen-gas refining processes and, for example, zinc-containing dust from electro-steel furnaces and blast furnaces, whereat these concentrates and dusts in addition to containing an oxide of Fe may also contain oxides of Ni, Co, Cr, Mo, W, Mn and Cu, which oxides could also be reduced-out and recovered, either in the form of a melt in the aforesaid shaft or, as is the case with Zn for example, in the form of a condensate obtained from the gas leaving the shaft.

According to another of said processes undergoing development, namely a German process, iron-oxide material is partially reduced to form a highly metallized product, which is then charged to the top of a reactor vessel containing a crude-iron melt, whereat oxygen gas and carbon are injected into the melt through the bottom of said vessel, for generating the energy required to melt said product. In the course hereof there is formed a hot gas which contains carbonmonoxide and hydrogen and which can be used for the partial reduction of the iron-oxide material. To judge from present day descriptions of this process, the manufacture of the partially reduced product, namely sponge iron, has been contemplated in solid phase in, for example, conventional shaft furnaces, which, however, require as a starting material a sintered product in lump form, for example sintered pellets, such a starting material being economically burdensome to the process. It would be possible to obtain considerable technical and economical advantages if the partial reduction process could, instead, be carried out in a fluidized bed, which, however, in practice excludes the use of fine-grain or dust-like starting materials when applying hitherto know techniques, for the reasons mentioned in the foregoing.

According to a further process undergoing development, namely the so-called Elred-process, a fine-grain iron-oxide material is partially reduced and then supplied to a d.c. operated arc furnace through a hollow electrode, whereat reductant and slag formers are also charged to the furnace, which contains molten crude iron. In this process, the problem associated with partial reduction of the fine-grain starting material is solved by effecting said partial reduction process at an overpressure in a so-called circulating fluidized bed, i.e. a process in which the material is blown up through and out of a shaft having a height, for example, of 25 m, whereafter the material is separated in cyclones and returned to the bottom of the partial reducing shaft. Reduction gas of requisite temperature is generated in the shaft, by blowing powderous carbon and air thereinto, the carbon being charged in a surplus quantity in order, together with the high gas rate, to prevent bogging at the given temperature, approximately 1225 K. It will be readily understood that the partial reduction stage utilized in this process is expensive from the investment point of view and is also difficult to put into operation, particularly in view of the problems associated with separating the treated materials in the cyclones. Considerable advantage could be gained if it were possible to partially reduce the fine-grain iron-oxide material in a fluidized bed which did not circulate. Furthermore, the reducing gas generated during the smelting and final-reduction process would, in itself, be sufficient to partially reduce the starting material to 50–60%, without needing to generate additional reduction gas from carbon. In this case, however, it is necessary to supply a certain amount of electrical energy from outside the process.

The object of the present invention is to provide a novel and advantageous reduction process in which the aforementioned disadvantages are eliminated in a simple and economic manner.

To this end it is proposed in accordance with the invention that in a method for manufacturing metal from fine-grain metal-oxide material comprising oxide of Fe and optionally also oxide of at least one of the metals Ni, Co, Cr, Mo, W, Mn and Cu, including a first reduction stage during which the oxide material is reduced at least partially in a fluidized state at a temperature of approximately 1025-1275 K. with a reduction gas containing carbonmonoxide, optionally in mixture with hydrogen, and a following smelting and final-reduction stage for forming a metal melt, there being used for said first reduction stage a reducing gas obtained from said smelting and final-reduction stage, the fine-grain metal-oxide material, prior to said first reduction stage, is formed in the presence of moisture and a binder into cakes or shaped pieces whose size substantially exceeds the maximum size desired for fluidization, whereafter the cakes or shaped pieces are permitted to harden and are then disintegrated and classified to form the starting material for said first reduction stage, said material being given such a particle size distribution that it forms, a fluidized bed which is substantially stationary at the considerable gas velocity required for carrying out the reduction process without bogging at the temperature chosen for the first reduction stage. In this way there can be formed economically a bed having a grain distribution which is optimal from the aspect of fluidization and which can be selected with respect to the requisite gas velocity and the amount of reduction gas available, thereby eliminating or minimising the need to circulate material and gas in the system, and enabling the necessary apparatus to be simplified.

The optimal bed structure should be established experimentally in each particular case, whereat any tendency of the disintegrated material to pack densely is avoided by removing during said classifying step particles which lie within a given particle range, and returning said particles and forming cakes or shaped pieces therefrom together with the fine-grain starting material. Thus, it should be ensured that the grain size distribution of the bed material differs from the so-called Fuller-curve.

To enble the partial reduction stage to be carried out without supplying external heat, and for the purpose of further increasing the strength of the disintegrated and classified material, said material can suitably be pre-heated prior to said first reduction stage, using to this end a hot gas generated by combusting the combustible gas originating from the first reduction stage. In this respect, the pre-heating step can be carried out to particular advantage in a fluidized bed. The disintegrated and classified material can be preheated to approximately the temperature at which the partial reduction stage is carried out, i.e. to about 1025-1275 K., whereat it can be ensured that the pre-heating gas is sufficiently oxidizing to oxidize and volatilize any sulphidesulphur impurities present in the oxide material.

Dust formed during the pre-heating and/or partial reduction of the material in said first reduction stage can be separated, for example in a cyclone, said separated dust suitably being returned and formed into cakes or shaped pieces together with fine-grain starting material. In this way the dust can be recovered in a simple manner, without needing to circulate solid material in the partial reduction and preheating stages respectively, and without requiring a separate stage for working-up the dust. It will be understood that even dust originating from the smelting and final-reduction stage can, if so desired, be separated, in a cyclone for example, and returned for agglomeration together with fine-graim starting material.

Zinc oxide present in the fine-grain starting material is normally not reduced to metal form until the smelting and final-reduction stage, in which stage the zinc is vapourized and may be condensed in a conventional zinc condensor arranged between the smelting and final-reduction stage and said first reduction stage. Any lead oxide present will be reduced to metal form in the smelting and final-reduction stage and can be at least partially fumed off and condensed in the same manner as zinc.

The cakes or shaped pieces may, to advantage, be formed with the aid of a binder which contains substances which are desirable in said smelting and final-reduction stage as slag formers, these substances preferably being taken from the group burnt or slaked lime, burnt or slaked dolomite, cement, blastfurnace slag, basic slag obtained from the manufacture of crude iron and steel, dust obtained from basic steel-refining processes and fly ash obtained from carbon-combustion processes. The amount of binder required is normally approximately 2% by weight, although larger quantities can be chosen, primarily depending upon the metallurgical requirements, for example so that the shaped and hardened material will contain all the slagformer required. As will be seen from the aforegoing, the binder may comprise completely or partially a material, such as dust or fly, ash, which cannot otherwise the utilized to advantage or which creates a duping problem. The addition of lime, and primarily dolomite, as the binder, however, affords advantages resulting from the formation of basic slag and ferrite in the pre-heating stage, which results in elevated reduction strength at the partial reduction temperatures in question and a higher melting point, enabling a high temperature, with a subsequent high reduction rate, to be maintained during the reduction stage, without bogging.

If, as preferred, the fine-grain starting material is formed into cakes or shaped pieces by compacting the same between smooth or profiled, pressure-loaded rolls, it should be ensured that the moisture content (water content) of the starting material used corresponds, as far as possible, to the amount of binding agent used and its ability to absorb water. At the same time, however, it should be ensured that the moisture content is substantially less than the pore volume of the cakes or pieces formed by compaction, so that no free moisture is found on the surfaces of said agglomerates, since this would render compaction difficult. The aforementioned cakes are given a relatively small thickness, for example a thickness of from 4 to 12 mm, so that they harden relatively quickly. The cakes or shaped pieces can be hardened on a gas-permeable belt or in stacks or bunkers, through which hot air or hot flue-gases containing carbon dioxide can be caused to flow in order to accelerate the hardening process. Disintegration of the hardened cakes, flakes or shaped pieces can be effected by means, for example, of spiked rollers or by crushing the agglomerates with the aid, for example, of jaw cruchers, roll crushers or hammer crushers, suitably to a largest particle size or a largest particle crosssection within a range of 6-8 mm. When classifying the disintegrated agglomerates, those particles which are smaller than the smallest particle size desired, for example particles whose size is smaller than 0.2 mm, are screened-off, and possibly, in the case of a harmonic grain-size distribution, a part or the whole of the particles lying within a selected grain-size interval is also screaned off, in order to break the harmonic distribution, so that the particle size distribution no longer follows a Fuller curve.

The smelting and final-reduction stage can, to advantage, be carried out in a furnace which is at least partially heated electrically, for example an induction furnace, an electric arc furnace or elector-slag resistance furnace, while supplying a reductant, such as carbon, coke, brown coal, oil or natural gas. The amount of reductant used is suitably adapted so that the gas leaving the furnace is sufficient with respect both to quantity and to reduction potential for reducing the material in the partial reduction stage to approximately a 50-60% degree of reduction, whereby no additional reductant need be charged to the partial reduction stage.

According to another suitable embodiment of the invention, the smelting and final-reduction stage is carried out in a converter by injecting carbonaceous material and oxygen into a melt of reduced metal. In this case, since no electrical energy is supplied to the smelting and final-reduction stage, carbonaceous material is suitably supplied in an amount which is in such excess relative to the oxygen that the reducing gas generated in the converter is sufficient to reduce the material in the partial reduction stage to the greatest possible extent, preferably to at least approximately 85% degree of reduction.

To avoid dust and mixing problems, the partially reduced material formed by said partial reduction in the first reduction stage is suitably injected into the melt in the converter or furnace.

In accordance with a further preferred embodiment of the invention, the smelting and final-reduction stage of the material at least partially reduced in said first reduction stage is carried out in a high-temperature zone, generated by means of a plasma burner, in a coke-filled furnace shaft while simultaneously supplying a reductant to said zone.

The invention is not restricted to the aforedescribed embodiments, but that modifications can be made within the scope of the following claims. Thus, is may be advantageous and lies within the perview of the invention to use two types of binders, of which one, e.g. bentonite, ferro sulphate, calcium chloride, molasses, optionally neutralized sulphate liquor etc., is capable of initially binding and harden the cakes or shaped pieces to a degree sufficient to enable the desired disintegration and classification to be carried out, while the other binder, e.g. a hydraulic binder, is capable of increasing the particle strength during following operations.

We claim:

1. A method for manufacturing metal from fine-grain metal-oxide material selected from the group consisting of oxides of iron and oxides of iron in combination with oxides of metals selected from the group consisting of Ni, Co, Cr, Mo, W, Mn and Cu, including a first reduction stage during which the oxide material is reduced at least partially in a fluidized state at a temperature of approximately 1025–1275 K. with a reduction gas selected from carbon monoxide and carbon monoxide in combination with hydrogen, and a following smelting and final-reduction stage for forming a metal melt, there being used for said first reduction stage a reducing gas obtained from said smelting and final-reduction stage, characterized by forming the fine-grain metal-oxide material, prior to said first reduction stage, in the presence of moisture and a binder into cakes or shaped pieces whose size substantially exceeds the maximum size desired for fluidization; permitting said cakes or shaped pieces to harden and then disintegrating and classifying the same to form the starting material for said first reduction stage, said material being given such a particle size distribution that it forms a fluidized bed which is substantially stationary at the considerable gas velocity required for carrying out the reduction process without bogging at the temperature chosen for the first reduction stage.

2. A method according to claim 1, characterized by removing in the classifying step particles which lie within a given particle size range, and returning said particles and forming the same into cakes or shaped pieces together with the fine-grain starting material, thereby avoiding any tendency of the disintegrated material to pack tightly.

3. A method according to claim 1, characterized in that, prior to said first reduction stage, the disintegrated and classified metal-oxide material is pre-heated and further hardened while using hot gas generated by the combustion of combustible gas originating from the first reduction stage.

4. A method according to claim 1, characterized in that dust generated during the preheating step and/or said first reduction stage is separated and returned and formed into cakes or shaped pieces together with the fine-grain starting material.

5. A method according to claim 1, characterized in that the cakes or shaped pieces are formed by compaction of the starting material between smooth or profiled pressure-loaded rolls.

6. A method according to claim 5, characterized in that the amount of moisture used is substantially smaller than the pore volume of the cakes formed by compaction.

7. A method according to claim 1, characterized in that the smelting and final-reduction stage is carried out in a furnace which is heated at least partially electrically while supplying a reductant, such as carbon, coke, brown coal, oil or natural gas.

8. A method according to claim 1, characterized in that the smelting and final-reduction stage is carried out in a converter, by injecting carbonaceous material and oxygen into a reduced-metal melt.

9. A method according to claim 7, characterized in that the at least partially reduced material formed in said first reduction stage is injected into said melt.

10. A method according to claim 1, characterized in that the smelting and final-reduction of the at least partially reduced material formed in said first reduction stage is carried out in a high-temperature zone generated in a coke-filled furnace shaft with the aid of a plasma burner, while at the same time supplying a reductant to said zone.

11. A method according to claim 1 wherein said groups further consists of Zn and Pb, characterized in that any metal vapor primarily of zinc and lead, present in the reducing gas obtained from the smelting and final-reduction stage is removed from said reducing gas prior to using the same for said first reduction stage.

12. A method according to claim 1, characterized in that the cakes or shaped pieces are treated with hot air or hot flue-gases containing carbon dioxide.

13. A method according to claim 3 characterized in that a fluidized bed is used to pre-heat and harden the disintegrated and classified metal-oxide material.

14. A method according to claim 1 wherein said binder is a substance which is desirable in the smelting and final reduction stage as a slag former.

15. A method according to claim 14 wherein said binder is selected from burnt lime, slaked lime, burnt dolomite, slaked dolomite, cement, blast furnace slag, basic slag obtained from the manufacture of crude iron or steel, dust obtained from basic steel refining processes, and fly ash obtained from carbon-combustion processes.

16. A method according to claim 8 wherein said furnace is selected from an induction furnace, an electric arc furnace and an electro-slag resistance furnace.

17. A method according to claim 11 wherein said metal vapors are removed by condensation.

* * * * *